(12) United States Patent
Gretton et al.

(10) Patent No.: US 7,865,304 B2
(45) Date of Patent: Jan. 4, 2011

(54) NAVIGATION DEVICE DISPLAYING DYNAMIC TRAVEL INFORMATION

(75) Inventors: Mark Gretton, London (GB); Michiel Mayer, Amsterdam (NL); Dion Nicolaas, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 639 days.

(21) Appl. No.: 10/598,900

(22) PCT Filed: Mar. 15, 2005

(86) PCT No.: PCT/GB2005/000977
§ 371 (c)(1),
(2), (4) Date: Jun. 15, 2007

(87) PCT Pub. No.: WO2005/088255
PCT Pub. Date: Sep. 22, 2005

(65) Prior Publication Data
US 2007/0225902 A1   Sep. 27, 2007

(30) Foreign Application Priority Data

Mar. 15, 2004 (GB) ................................. 0405795.6
Mar. 15, 2004 (GB) ................................. 0405797.2

(51) Int. Cl.
*G01C 1/30* (2006.01)
*G08G 1/137* (2006.01)

(52) U.S. Cl. .......................... 701/210; 701/207; 701/26; 701/212; 701/213; 340/995.13; 340/995.27

(58) Field of Classification Search .................. 701/207
See application file for complete search history.

(56) References Cited

U.S. PATENT DOCUMENTS

| 5,612,881 | A |   | 3/1997  | Moroto et al.         |
|-----------|---|---|---------|-----------------------|
| 5,694,122 | A |   | 12/1997 | Nakada                |
| 5,831,552 | A |   | 11/1998 | Sogawa et al.         |
| 5,864,305 | A | * | 1/1999  | Rosenquist ..... 340/905 |

(Continued)

FOREIGN PATENT DOCUMENTS

DE   100 41 800   3/2002

(Continued)

OTHER PUBLICATIONS

German Office Action dated Sep. 15, 2010 with English translation for corresponding German Application.

*Primary Examiner*—Thomas G Black
*Assistant Examiner*—Lin B Olsen
(74) *Attorney, Agent, or Firm*—Harness, Dickey & Pierce, P.L.C.

(57) ABSTRACT

An in-car navigation device depicts dynamic travel information (congestions, weather, etc.) in the context of a schematic display of the actual roads that the information relates to. In one implementation, the schematic view is a linear representation of the route and that schematic linear representation is displayed at the same time but separate from a map of a 2-D or 3-D representation of the actual road being traveled along and the current location of the device on that road. The device can send a request to a remote server over a wireless communications network for dynamic travel information relevant to a defined route and receive and display that information.

25 Claims, 11 Drawing Sheets

U.S. PATENT DOCUMENTS

| | | | |
|---|---|---|---|
| 6,006,161 A * | 12/1999 | Katou | 701/212 |
| 6,014,606 A * | 1/2000 | Tu | 701/200 |
| 6,256,577 B1 | 7/2001 | Graunke | |
| 6,760,661 B2 * | 7/2004 | Klein et al. | 701/210 |
| 6,820,003 B2 | 11/2004 | Ueno | |
| 6,898,519 B1 * | 5/2005 | Schilling | 701/208 |
| 6,954,696 B2 * | 10/2005 | Ihara et al. | 701/208 |
| 7,027,917 B2 * | 4/2006 | Ikeda | 701/211 |
| 7,289,904 B2 * | 10/2007 | Uyeki, Robert | 701/209 |
| 2003/0225508 A9 * | 12/2003 | Petzold et al. | 701/201 |
| 2004/0220727 A1 | 11/2004 | Adachi | |
| 2006/0058950 A1 * | 3/2006 | Kato et al. | 701/208 |
| 2006/0217881 A1 | 9/2006 | Pei et al. | |
| 2008/0088480 A1 | 4/2008 | Rozum et al. | |

FOREIGN PATENT DOCUMENTS

| | | |
|---|---|---|
| DE | 101 19 730 | 11/2002 |
| DE | 102 04 093 | 12/2002 |
| DE | 101 31 432 | 1/2003 |
| DE | 102 00 883 | 1/2003 |
| EP | 1 271 104 | 1/2003 |
| EP | 1 403 835 | 3/2004 |
| JP | 2001-304882 | 10/2001 |
| JP | 2001304882 A * | 10/2001 |

* cited by examiner

| | |
|---|---|
| Line incidents | |
| ▶▶▶▶ | Stationary traffic |
| ▶▶▶▶ | Queuing traffic |
| ▶▶▶▶ | Slow traffic |
| ■■■■ | Road closure / Lane closure / Road works |

| | | | |
|---|---|---|---|
| Point incidents | | | |
| 🚗 | Accident | Weather | |
| 🚘 | Traffic jam | 🌧 | Heavy rain |
| 🚧 | Road works | 💨 | Strong wind |
| 🚏 | Road Closure | ❄ | Ice |
| ! | General incident | ☰ | Fog |
| ⛔ | Lane closed | | |

Data feeds 134

NAVIGATION DEVICE DISPLAYING DYNAMIC TRAVEL INFORMATION

CROSS REFERENCE TO RELATED APPLICATIONS

This application claims the priority of PCT/GB2005/000977 filed on Mar. 15, 2005; GB 0405795.6 filed on Mar. 15, 2004; and, GB0405797.2 filed on Mar. 15, 2004, the entire contents of which are hereby incorporated in total by reference.

BACKGROUND OF THE INVENTION

1. Field of the Invention

This invention relates to a navigation device that can display dynamic travel information. Dynamic travel information is updated information about road driving and traffic conditions, such as information about congestion, road blocks, adverse weather etc. on particular routes. The information is dynamic in the sense that it can change. The information displayed on the device is ideally completely up to date, although in practice there is some time delay between observing and reporting on road and traffic conditions and receiving those reports at the device. The device finds particular application as an in-car navigation system.

2. Description of the Prior Art

GPS based navigation devices are well known and are widely employed as in-car navigation systems. Reference may be made to the Navigator series software from the present assignee, TomTom B.V. (now TomTom International B.V.). This is software that, when running on a PDA (such as a Compaq iPaq) connected to an external GPS receiver, enables a user to input to the PDA a start and destination address. The software then calculates the best route between the two end-points and displays instructions on how to navigate that route. By using the positional information derived from the GPS receiver, the software can determine at regular intervals the position of the PDA (typically mounted on the dashboard of a vehicle) and can display the current position of the vehicle on a map and display (and speak) appropriate navigation instructions (e.g. 'turn left in 100 m'). Graphics depicting the actions to be accomplished (e.g. a left arrow indicating a left turn ahead) can be displayed in a status bar and also be superimposed over the applicable junctions/turnings etc in the roads shown in the map itself. Reference may also be made to devices that integrate a GPS receiver into a computing device programmed with a map database and that can generate navigation instructions on a display. The term 'navigation device' refers to a device that enables a user to navigate to a pre-defined destination. The device may have an internal system for receiving location data, such as a GPS receiver, or may merely be connectable to a receiver that can receive location data.

Reference may be made to U.S. Pat. No. 5,612,881, which shows an in-car navigation device that can display a schematic representation of the entire journey and can display estimated arrival times at various points on the journey. Dynamic travel information is not however included in the display at all. Superimposing dynamic travel information onto a navigation map is however known from U.S. Pat. No. 5,831,552, U.S. Pat. No. 5,694,122 and U.S. Pat. No. 5,864,305.

In-car navigation systems may have access to real-time updated travel information; for example, in the Smartnav™ system from TrafficMaster plc, a central server receives real time updated traffic information from sensors located by the roadside of the UK road network. The server calculates routes to be followed, given a driver's start and destination address, and sends that route information to an in-vehicle device which speaks appropriate instructions to the driver (hence, there is no map display as such). When congestion etc. is spotted that is relevant to a particular driver's route, the server can send a message to that driver's navigation device, which is then relayed as an audio alert to the driver.

Superimposing dynamic travel information onto a navigation map generated and displayed by an in-car navigation device is also known from U.S. Pat. No. 5,831,552, U.S. Pat. No. 5,694,122 and U.S. Pat. No. 5,864,305.

SUMMARY OF THE INVENTION

In a first aspect, there is a navigation device programmed with a map database and software that enables a route to be planned between two user-defined places, in which the device is further programmed (i) to be able to calculate and to display a 2-D or 3-D representation of the actual road being traveled along and the current location of the device on that road and (ii) to receive and process dynamic travel information relating to the route;

wherein the device is adapted to calculate and to display a schematic view showing at least the remainder of the entire route, the schematic view appearing on a single screen and including dynamic travel information relating to the route and.

The present invention hence moves away from the established approach of integrating dynamic (e.g. changing or updated) travel information directly onto the 2-D or 3D navigation map representation. By calculating an entirely separate schematic view of at least the remainder of the route and displaying that view on a single screen, it enables the user to immediately see at a glance if there are major delays etc. anywhere on the proposed route. Previously, it was very difficult for the user to see at a glance whether any major traffic incidents affected the route: he would have for example to scroll through a list or 2D display of the entire route, perhaps involving many separate interactions with the device.

In one implementation, the schematic view is a linear representation of the route or the remainder of the route not yet traveled along. Icons representing different travel disturbances (e.g. traffic jams, ice etc.) can be placed on this linear representation; the device uses the approximate distance to the disturbance to place it at the correct position on the linear representation.

An icon may be displayed that represents how recently the dynamic travel information was received by the device: this is especially useful for traffic information since the user will often wish to know how up to date the information is. Also, the user can request updated dynamic travel information by selecting an appropriate function displayed on the device; the 'data freshness' icon serves as a useful indication as to when that may be useful.

The dynamic travel information may be displayed at the same time as the 2-D or 3-D representation of the actual road being traveled along; for example, in a separate window to one side of the main navigation map. This separate section could be always shown when the navigation map is shown, or it could be shown only when an option to display dynamic travel information has been selected by the user. Alternatively, it may be displayed only on a different screen from the main navigation map; for example, the user tasks away from the screen showing the navigation map to a screen showing the schematic display.

The device can (directly itself or using another device with communications capabilities) send a request to a remote server over a wireless communications network for dynamic travel information relevant to a defined route, the remote server (i) receiving dynamic travel information from one or more data feeds in relation to numerous roads and (ii) sending the dynamic travel information that is relevant to the defined route to the device in response to the request. Using a server to collect and analyse dynamic travel information is a very efficient and extensible approach, readily enabling new kinds of travel information to be handled and wirelessly distributed to navigation devices. The device may include an integral radio receiver that can receive the dynamic travel information or may set up a short range link with a mobile telephone, the mobile telephone then receiving the dynamic travel information over the cellular network and passing it along to the adjacent navigation device.

BRIEF DESCRIPTION OF THE DRAWINGS

The present invention will be described with reference to the accompanying drawings, in which.

DETAILED DESCRIPTION

System Overview

The present invention is implemented in software from TomTom B.V. (now TomTom International B.V.) called Navigator. Navigator software runs on a touch screen (i.e. stylus controlled) Pocket PC powered PDA device, such as the Compaq iPaq. It provides a GPS based navigation system when the PDA is coupled with a GPS receiver. The combined PDA and GPS receiver system is designed to be used as an in-vehicle navigation system. The invention may also be implemented in any other arrangement of navigation device, such as one with an integral GPS receiver/computer/display: Appendix 1 is a description of such a device. It may also be implemented as a device designed for non-vehicle use (e.g. for walkers) or vehicles other than cars (e.g. aircraft). The navigation device may implement any kind of position sensing technology and is not limited to GPS; it can hence be implemented using other kinds of GNSS (global navigation satellite system) such as the European Galileo system. Equally, it is not limited to satellite based location/velocity systems but can equally be deployed using ground-based beacons or any other kind of system that enables the device to determine its geographic location.

Figure 1:
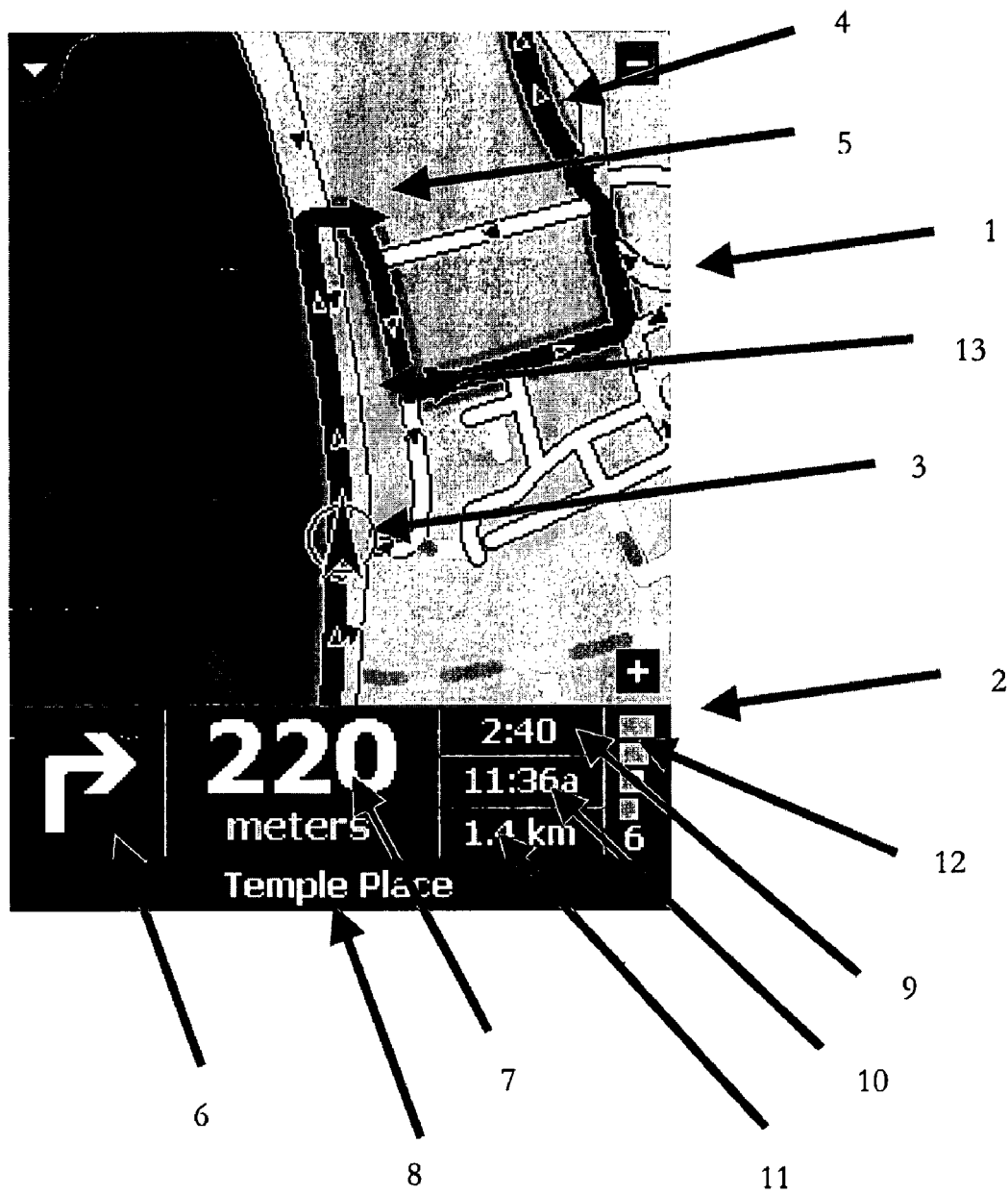
FIG. 1 is a screen shot from a navigation device implementing the present invention; the screen shot shows a plan map view and a status bar running along the bottom of the display.
Figure 2:
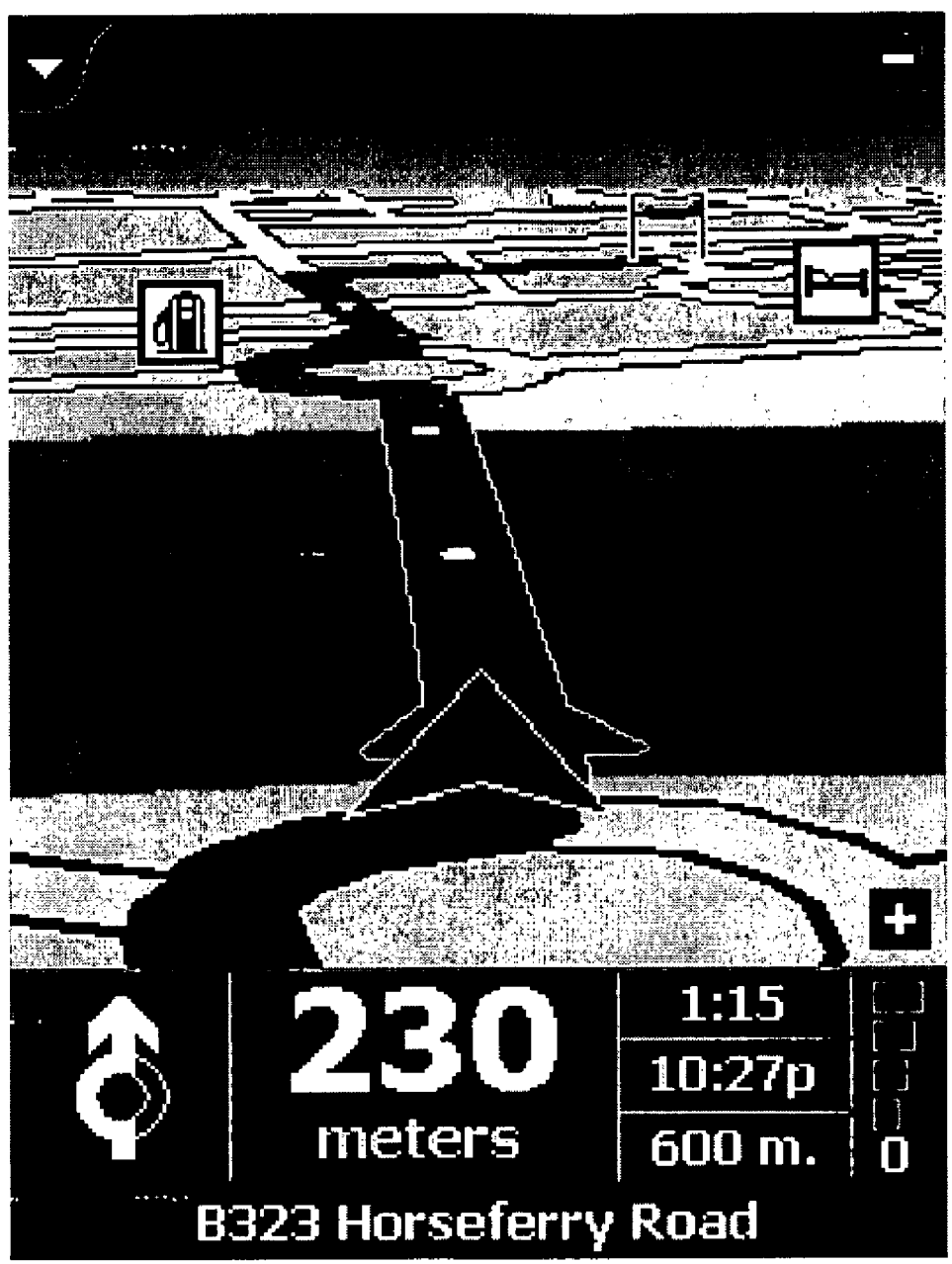
FIG. 2 is a screen shot from the navigation device implementing a 3-D view.

Navigator software, when running on a PDA, results in a navigation device that causes the normal navigation mode screen shown in FIG. 1 to be displayed. This view provides driving instructions using a combination of text, symbols, voice guidance and a moving map. Key user interface elements are the following: a 2-D map 1 occupies most of the screen. The map shows the user's car and its immediate surroundings, rotated in such a way that the direction in which the car is moving is always "up". Running across the bottom quarter of the screen is the status bar 2. The current location of the device, as the device itself determines using conventional GPS location finding and its orientation (as inferred from its direction of travel) is depicted by an arrow 3. The route calculated by the device (using route calculation algorithms stored in device memory as applied to map data stored in a map database in device memory) is shown as darkened path 4 superimposed with arrows giving the travel direction. On the darkened path 4, all major actions (e.g. turning corners, crossroads, roundabouts etc.) are schematically depicted by arrows 5 overlaying the path 4. The status bar 2 also includes at its left hand side a schematic 6 depicting the next action (here, a right turn). The status bar 2 also shows the distance to the next action (i.e. the right turn—here the distance is 220 meters) as extracted from a database of the entire route calculated by the device (i.e. a list of all roads and related actions defining the route to be taken). Status bar 2 also shows the name of the current road 8, the estimated time before arrival 9 (here 2 minutes and 40 seconds), the actual estimated arrival time 10 (11.36 am) and the distance to the destination 11 (1.4 Km). The GPS signal strength is shown in a mobile-phone style signal strength indicator 12. A 3-D map view is also possible, as shown in FIG. 2.

If the user touches the centre of the screen 13, then a navigation screen menu is displayed; from this menu, other core navigation functions within the Navigator application can be initiated or controlled. Allowing core navigation functions to be selected from a menu screen that is itself very readily called up (e.g. one step away from the map display to the menu screen) greatly simplifies the user interaction and makes it faster and easier.

The area of the touch zone which needs to be touched by a user is far larger than in most stylus based touch screen systems. It is designed to be large enough to be reliably selected by a single finger without special accuracy; i.e. to mimic the real-life conditions for a driver when controlling a vehicle; he or she will have little time to look at a highly detailed screen with small control icons, and still less time to accurately press one of those small control icons. Hence, using a very large touch screen area associated with a given soft key (or hidden soft key, as in the centre of the screen 13) is a deliberate design feature of this implementation. Unlike other stylus based applications, this design feature is consistently deployed throughout Navigator to select core functions that are likely to be needed by a driver whilst actually driving.

Hence, whenever the user is given the choice of selecting on-screen icons (e.g. control icons, or keys of a virtual keyboard to enter a destination address, for example), then the design of those icons/keys is kept simple and the associated touch screen zones is expanded to such a size that each icon/key can unambiguously be finger selected. In practice, the associated touch screen zone will be of the order of at least 0.7 cm.sup.2 and will typically be a square zone. In normal navigation mode, the device displays a map. Touching the map (i.e. the touch sensitive display) once (or twice in a different implementation) near to the screen centre (or any part of the screen in another implementation) will then call up a navigation menu (see FIG. 10) with large icons corresponding to various navigation functions, such as the option to calculate an alternative route, and re-calculate the route so as to avoid the next section of road (useful when faced with an obstruction or heavy congestion); or recalculate the route so as to avoid specific, listed roads.

The actual physical structure of the device itself may be fundamentally no different from any conventional handheld computer, other than the integral GPS receiver or a GPS data feed from an external GPS receiver. Hence, memory stores the route calculation algorithms, map database and user interface software; a microprocessor interprets and processes user input (e.g. using a device touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination in the normal manner into the Navigator software running on the PDA using a virtual keyboard. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of Navigator (or is otherwise accessed by it) running on the PDA as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the Navigator software. The algorithms are applied to score large numbers of potential different routes. The Navigator software then evaluates them against the user defined criteria (or device defaults), such as a full mode scan, with scenic route, past museums, and no speed camera. The route which best meets the defined criteria is then calculated by a processor in the PDA and then stored in a database in RAM as a sequence of vectors, road names and actions to be done at vector end-points (e.g. corresponding to pre-determined distances along each road of the route, such as after 100 meters, turn left into street x).

Dynamic Travel Information Function

Figure 3:
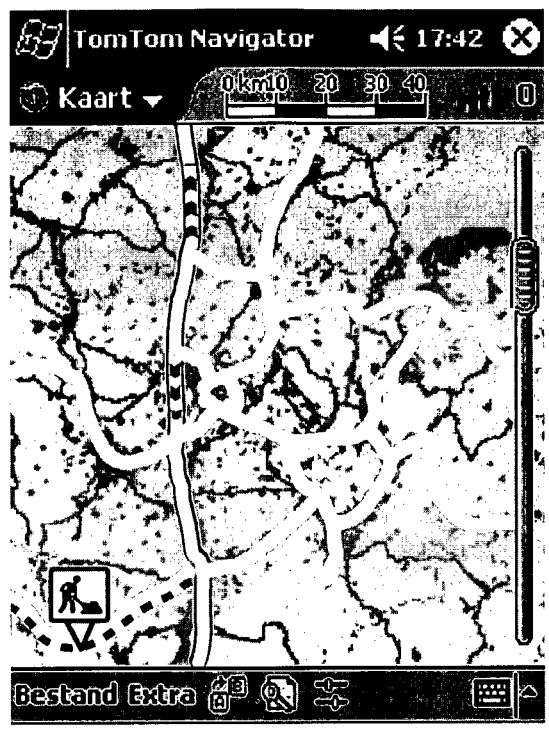
FIGS. 3, 4 and 5 are other screen shots showing dynamic traffic information superimposed over a road; various zoom levels are shown.
Figures 11, 12, 13:
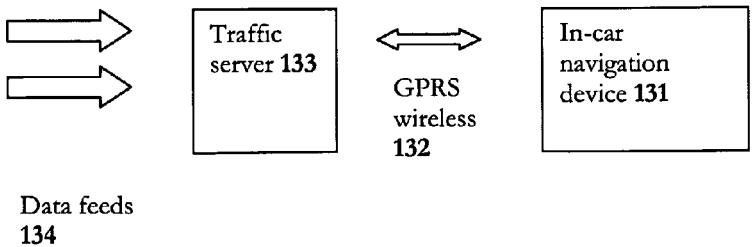
FIG. 11 depicts how different types of traffic flow can be graphically represented.
FIG. 12 depicts how different road incidents can be graphically represented.
FIG. 13 is a general system diagram showing how the device of the present invention receives dynamic travel information from a remote server over a wireless connection.

Navigator can display dynamic travel information. This can appear in two forms. First, over a normal navigation map view, such as shown in FIG. 3. Here, the roads to be traveled along are shown in the normal, schematic manner of a digital map. But superimposed over some schematic representations of roads are colour coded arrows; these indicate traffic flow conditions of potential concern to the driver at the overlaid sections of the road. The arrow direction indicates traffic flow direction. FIG. 11 is a key to the meaning of these different arrows. The icons graphically represent:

(i) stationery traffic (red arrows);
(ii) queuing traffic (orange arrows);
(iii) slow traffic (yellow arrows);
(iv) road closure or lane closure or road works (dotted black line)

Figure 4:
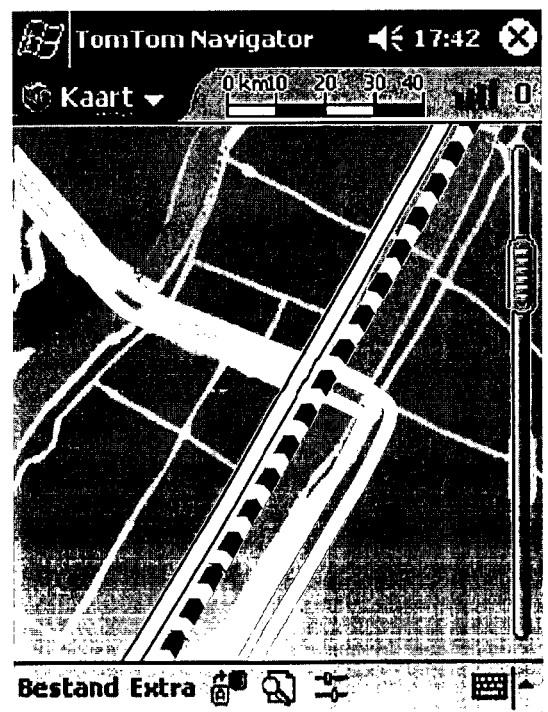
Figure 5:
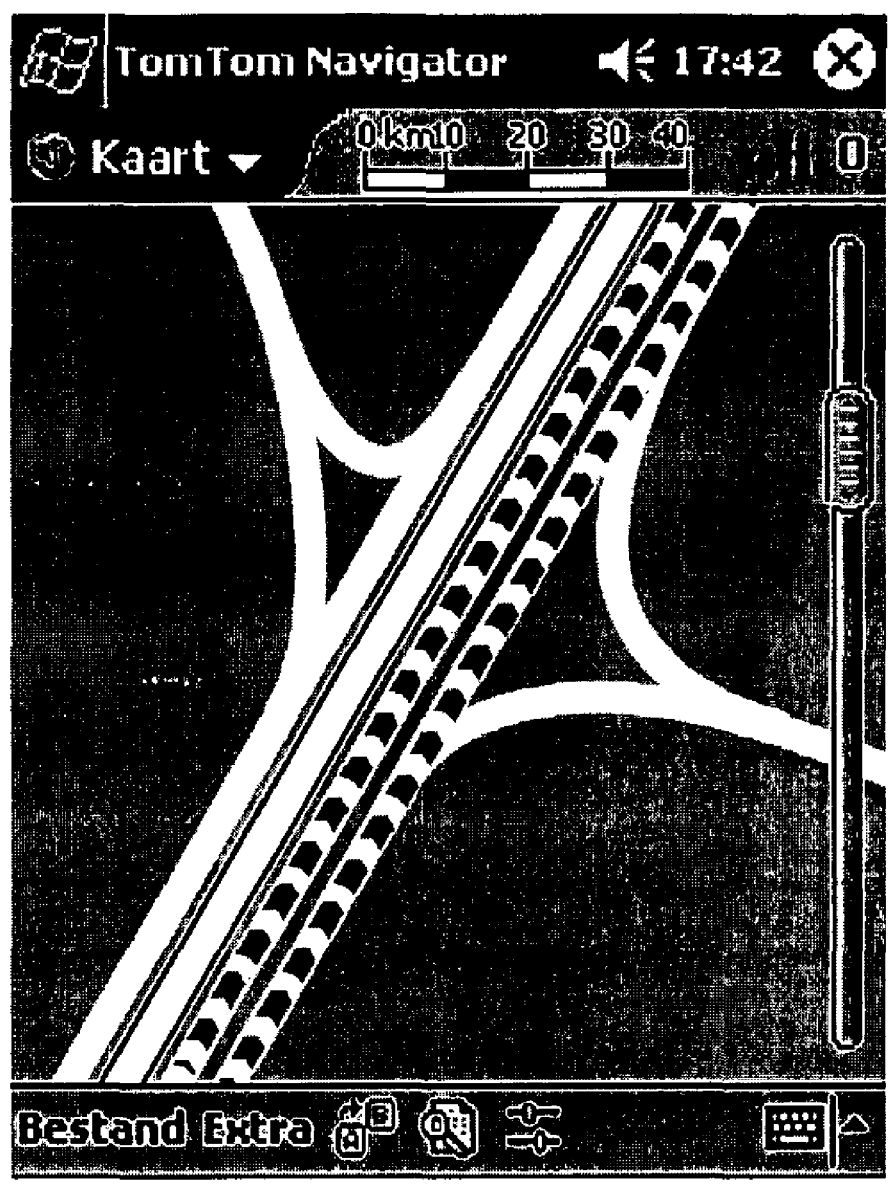

In addition, a graphical icon representing road works is also shown, indicating the exact location of the road works on a particular road. FIG. 4 shows how the map can be zoomed in using normal zoom controls, such as slider bars; FIG. 5 is at an even higher zoom level.

Figure 6:
FIG. 6 is a screen shot showing a standard navigation view and a 3-D map, with dynamic travel information displayed as a ticker below the status bar.

FIG. 6 shows how dynamic traffic information can be incorporated into a ticker at the bottom of the status bar.

Figure 7:
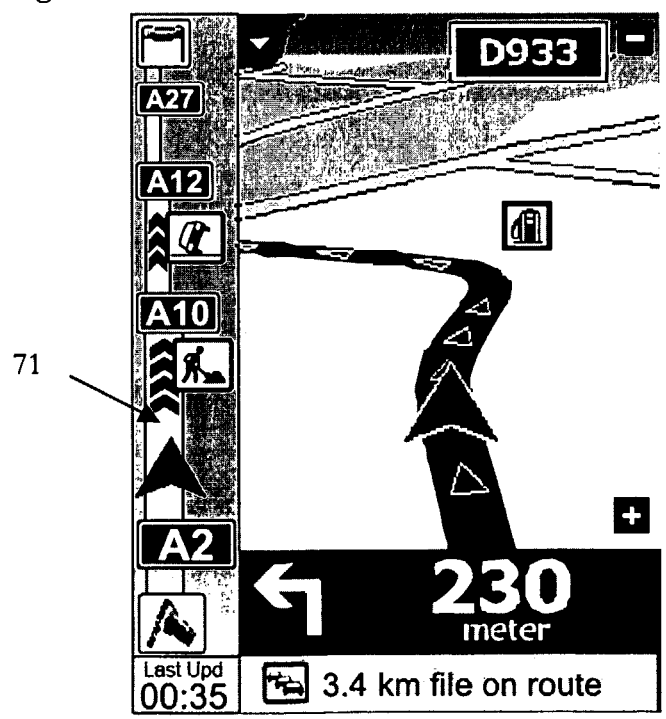
FIG. 7 is a screen shot showing a linear schematic view of the route together with a standard navigation map view.

FIG. 7 shows how the device can also compute and display a schematic view showing the entire route on a single screen; this is the vertical linear representation 71 running along the left hand side of the screen. It therefore accompanies the normal navigation map view (2-D or 3-D) showing the actual road being traveled along and the current location of the device on that road. All of the major roads forming the route are displayed here; for complex routes involving large numbers of different roads, the device is programmed to prioritise roads for display according to length (in the absence of significant dynamic travel information); if any road on the route has dynamic travel information associated with it, then that road will be included in the schematic 'entire route' representation as a priority. Hence, the constituent elements in this linear representation can alter during the journey as new travel information is received by the device (a later section will describe how dynamic travel information is generated at a remote server and sent to the device).

In any event, the schematic linear view of the route (just like the schematic non-linear, map based view of the route in FIGS. 3, 4 and 5) has superimposed over some of its constituent roads colour coded arrows, again indicating in the same way traffic flow conditions at the overlaid sections of the road using the FIG. 11 coding.

Figure 8A:
FIG. 8A is a screen shot showing a simplified, linear schematic route view

A more simplified schematic view, showing just the remainder of the route is also possible, as shown in FIG. 8A. In FIG. 8A, the vertical bar 80 (on the right) linearly represents the route from the current position to the destination; i.e. the remainder of the route. Any icon(s) on the bar show the start of traffic incidents (in the image, icon 81 represents a traffic jam). A fine line (red in an actual implementation) indicates how far the traffic jam stretches. At the top of the bar, a symbol 82 indicates how recent the traffic information is: in this implementation, a full green ball indicates the data is less than a minute old. After a minute, the indicator will shrink (like a pie being eaten) until it is gone (indicating 30 minutes or older).

Figure 8B:
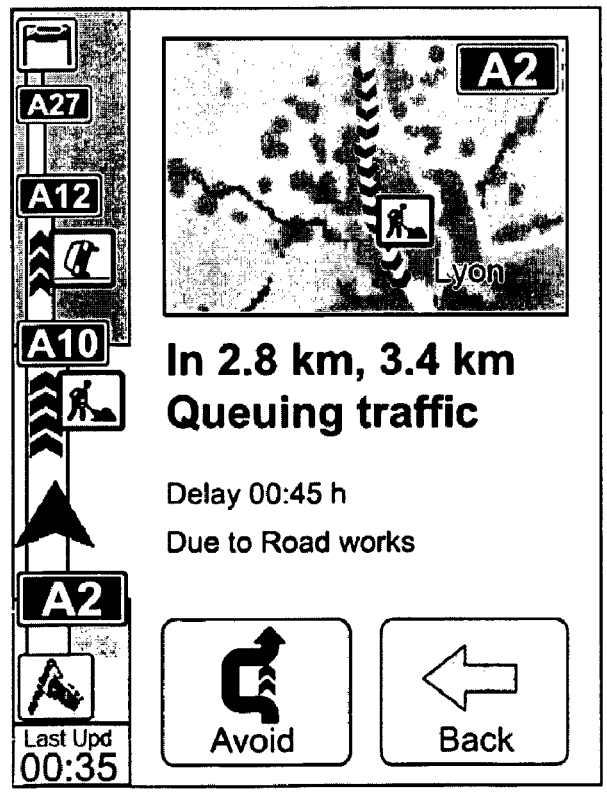
FIG. 8B is a screen shot showing a linear schematic route view, plus more detailed dynamic traffic information.

In addition to the FIG. 11 way of representing traffic flow related dynamic travel information, dynamic travel information can also be represented by a graphical icon or other kind of selectable option. FIG. 12 depicts the graphical icons used and their meaning. These include the following:

(i) accident;
(ii) traffic jam;

(iii) road works;

(iv) road closure;

(v) general incident;

(vi) lane closed;

Apart from graphical icons, it is also possible to use control or check boxes or names. Generally, graphical icons are preferred though. Each icon is positioned adjacent to the affected part of the route it relates to, schematically represented by the vertical linear representation of the entire route. If the user selects a graphical icon, then the device displays more detailed traffic information; the effect of selecting the 'road works' graphic icon indicating road works on the A2 road is shown in FIG. 8B. Selection is achieved by touching the screen at an icon (once, or in some variants a double touch); as noted above, large touch screen activation zones are used—sufficiently large (e.g. 0.7 cm$^2$ in area or more) to allow an icon to be reliably selected with a fingertip. The detailed information is not only a zoomed in view of the map view of the affected part of the A2 road, but also a textual description of the relevant incident ("In 2.8 km, 3.4 km of queuing traffic") and the estimated delay ("00.45 hours"). In addition, the device displays an 'avoid' option; if selected by touching the 'avoid' button, then the device automatically re-calculates a route that avoids the affected road. That entire route will then be displayed as a schematic, linear representation, enabling the driver at a glance to check whether there are any traffic incidents or reduced traffic flow affecting any parts of the new route. Implicitly, if no incidents or congestion is shown, then the user can at a glance see that the entire route is a clear one.

Figure 9:
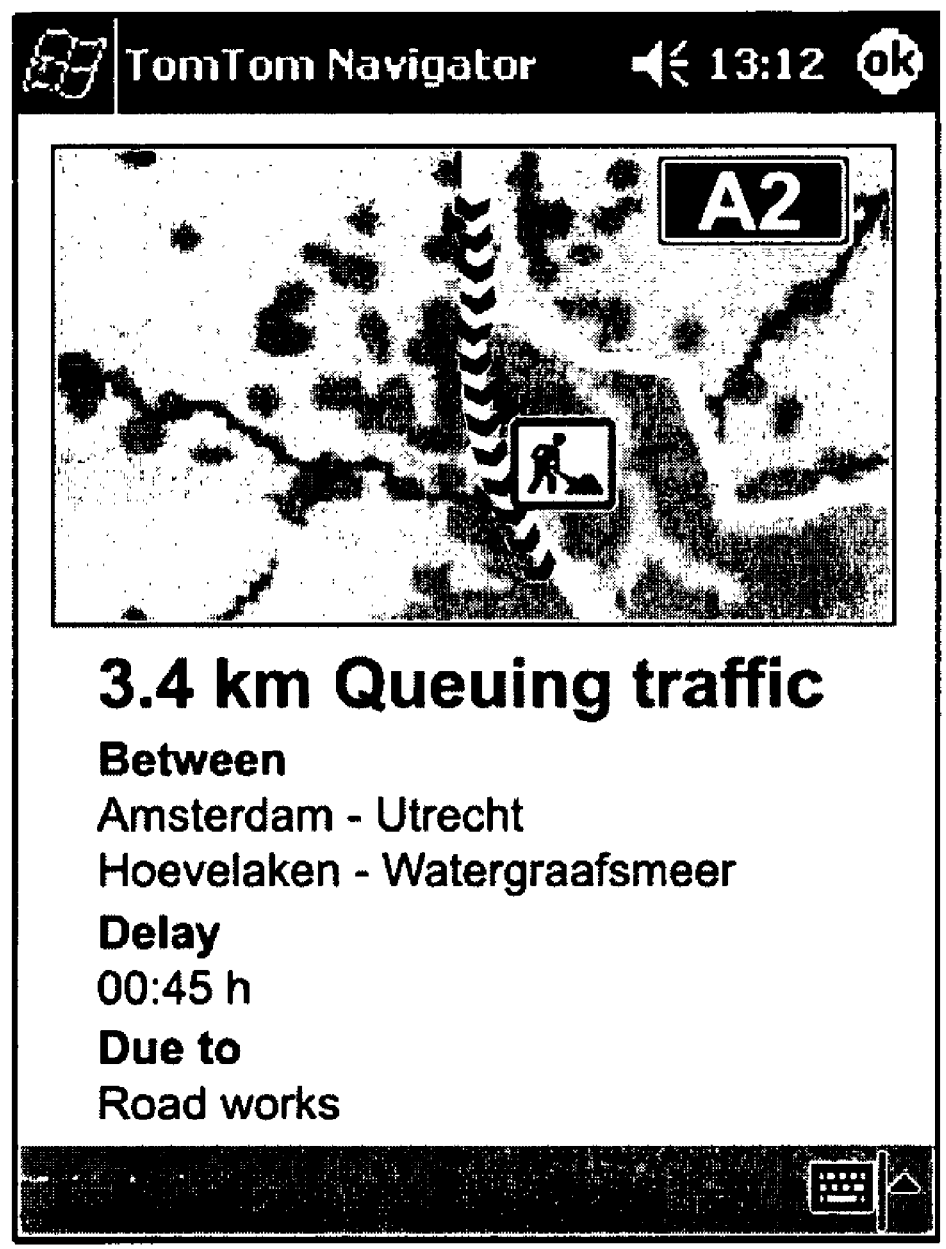
FIG. 9 is a screen shot showing the most detailed level of dynamic travel information.

If instead of selecting the 'avoid' control option, the driver selects the 'road works' graphic icon again (either the one in the linear representation of the entire route, or the corresponding one in the zoomed in map showing the affected part of the A2), then the device displays more textual information and a larger, more zoomed in map view of the affected part of the A2 road, as shown in FIG. 9.

Figure 10:
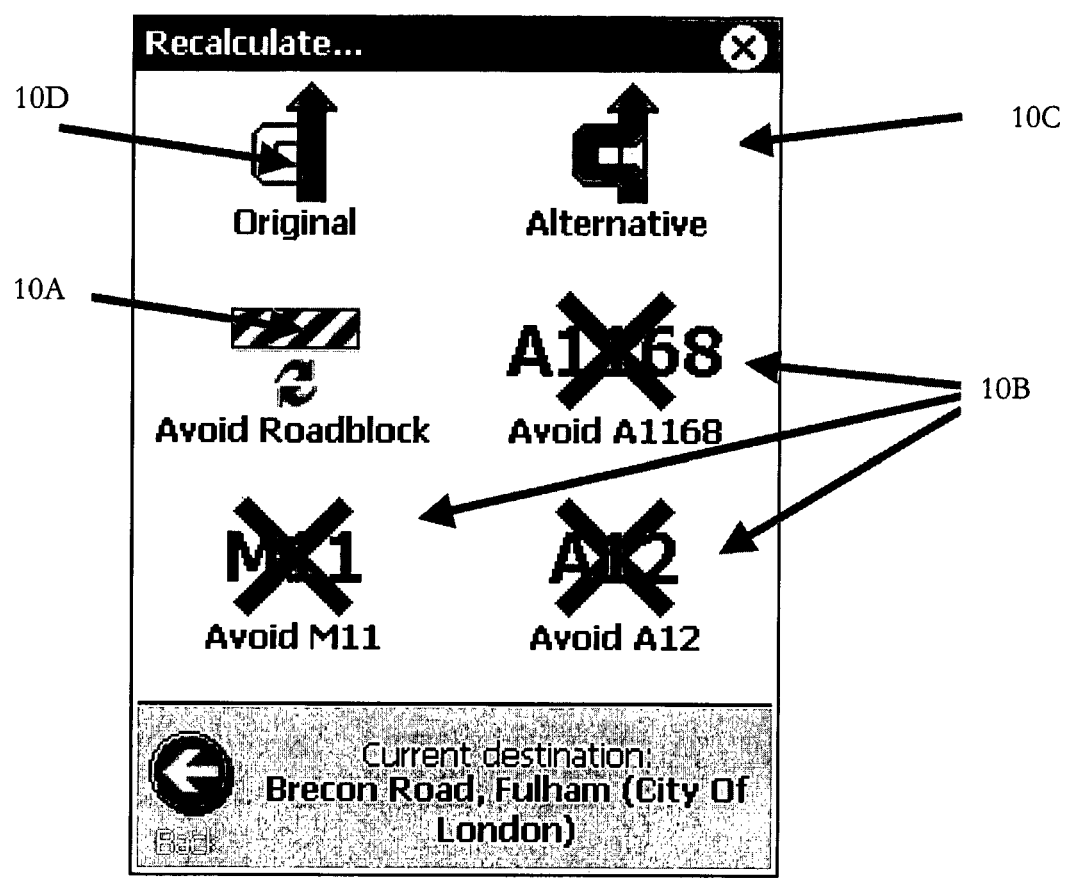
FIG. 10 is a screen shot showing a menu of route re-calculation options.

From the normal navigation view (e.g. FIGS. 1-7), if the driver touches anywhere close to the centre of the map view, then the device automatically tasks away from the map view to a menu of route re-calculation options, as shown in FIG. 10. The options are:

(a) calculate alternative route: 'plan around traffic jams';

(b) calculate alternative route without including a pre-defined extent of the road ahead—'avoid roadblock';

(c) calculate alternative route without including a pre-defined road;

(d) revert to original route.

For option (c) above, Navigator shows graphical icons for three different roads with a cross through the icon; selecting any one of these initiates a route re-calculation and excludes the defined road. The menu of re-calculation options is itself dynamically updated; it shows the next 3 roads that have associated with them dynamic travel information (these are the ones that the driver is most likely to need to avoid). The device therefore selects roads to include as one of the three by including the next three roads on the route which have some kind of traffic incident or undesirable traffic flow. Hence, the user can very readily and efficiently initiate a route re-calculation to avoid difficulties.

FIG. 13 is an overall system architecture view. It shows the navigation device 131 with a built-in wireless transceiver communicating with a remote, 'traffic' server 133. One implementation uses a GPRS transceiver, but any form of wireless communication is possible (GSM, SMS messages, other format of message). Using the GPRS capabilities of a mobile telephone by linking to that phone using a cable interface, Bluetooth or other short distance connection is also possible and eliminates the need for a costly internal GPRS receiver. Appendix 1 describes one implementation called Go: this device includes a Bluetooth transceiver so that it can exchange data with a Bluetooth enabled mobile telephone or other device with long range wireless communications capabilities and hence indirectly use those capabilities.

The traffic server receives dynamic travel information from several data feeds 134 (in some countries, these are supplied by official, government bodies; in others, private organisations supply this data). The server 133 can receive any and all of these data feeds 134 and integrate them to build up as comprehensive a picture of dynamic travel information affecting all roads across one or more countries. Once a device 131 has calculated a route to a destination, it sends that route to the traffic server 133 over a GPRS cellular network 132, requesting that the traffic server 133 returns relevant dynamic travel information using a http request. The traffic server 133 then retrieves any relevant traffic information for any roads on that route and returns that information to the device 131 over network 132. That information may be itself geocoded (e.g. include WGC 84 format location data) to define the location to which the dynamic travel information relates. Alternatively, it may in fact not be geocoded, in which case the Navigator software running on the device 131 geocodes that data so that it can use it. For example, non-geocoded data could be in TMC (Traffic Message Channel) format and the device 131 then includes in memory TMC tables that it can look up in order to relate TMC location data to a location in the geocoded co-ordinate system that the device uses so that it can display the travel information at the applicable position on the map and the linear representation. TMC is also deployed in FM Radio Data System (RDS) and is used for broadcasting real-time traffic and weather information.

The device 131 can regularly (or at pre-defined times or intervals) poll the traffic server 133 for updated dynamic travel information. Alternatively, the initial request for dynamic travel information can trigger the server 133 to automatically push updated dynamic travel information to the device 131 as and when it receives updated travel information of relevance. Another variant is for server 133 to continuously broadcast a repeating carousel of traffic information for all routes in a given area. Device 131 then listens at all times to this broadcast, detecting whenever dynamic travel information of relevance to its route is broadcast and then capturing and using that information.

Because the device integrates dynamic travel information with a navigation program, it becomes far easier for a user to see if there are problems on a possible route and to recalculate that route to avoid those problems. Navigator facilitates route recalculation through a number of functions. Once a route has been re-calculated, a schematic of that route is displayed on the device together with dynamic travel information relating to that route; hence, the user can very quickly establish if the alternative route is better or worse than the original route.

Route Re-Calculation

An implementation of the present invention facilitates access to functions that enable alternative routes to be calculated by placing a menu of graphical icons (or any other kind of way or option to allow selection of the functions, such as lists, check boxes etc.) on a menu screen that is easily accessed from the main navigation screen—i.e. the screen that is displayed during actual or simulated/preview navigation. As noted above, in normal navigation mode (and also the 'demonstrate route' mode for simulated/preview navigation—see later), the device displays an animated map that shows the location of the navigation device as the journey progresses. Touching the map (i.e. the touch sensitive display) once (or twice in a different implementation) near to the screen centre (or any part of the screen in another implementation) will then call up a 'Recalculate' menu screen (see FIG. 10) with large icons corresponding to various navigation functions, such as the option to calculate an alternative route 10C; re-calculate the route so as to avoid the next section of road 10A (useful when faced with a roadblock); and recalculate the route so as to avoid specific, listed roads 10B. The following sections describe these and other alternative route functions in more detail. Some of these functions may be initiated directly from the Recalculate menu screen; others may be at a deeper level in the menu structure. However, all can be initiated by selecting options such as graphical icons, lists, check boxes which are unambiguously associated with touch screen areas that are large enough to allow the user to select them with a fingertip whilst safely driving, typically at least 0.7 cm$^2$ in area.

Alternative Route Function: 'Avoid Roadblock'

With this function, a user could select an 'avoid roadblock' function 10A that causes the system to recalculate a route on the basis that the road immediately ahead (or some user defined or system default distance ahead, e.g. 100 meters) is blocked.

As noted earlier, a route planning algorithm in Navigator will work out an optimal route (optimal may refer to criteria such as shortest time or shortest distance, or some other factors) by exploring different routes and scoring them against the required criteria. In this way, one route which best meets the defied criteria is generated. If whilst actually driving along a route, an unexpected event occurs that requires the user to detour away from the pre-calculated route, such as a roadblock, the user can inform the Navigator software that his immediate road ahead is blocked and require the software to re-calculate a new route, taking his current position as a new starting position, but taking the first turning possible away from the old calculated route. This first turning might be ahead or behind the current car position. The system, in constructing the new route, explores a large number of possible routes to the destination from the current position, but excludes the road immediately ahead.

Selecting the 'avoid roadblock' function 10A has to be fast and involve the absolute minimum number of screen interactions to minimise driver distraction. This can be achieved by the user being able to switch from normal navigation mode (in which the current position of the car is shown on a map, as shown in FIG. 1 or 2) to a Recalculate menu mode, as shown in FIG. 10, by pressing a key or selecting any point on the screen or selecting a given region of the screen. Where a given region has to be selected (e.g. the approximate centre of the map), then the touch activation zone is sufficiently large that it can readily and reliably be selected by a user with his fingertip without needing to look carefully at the screen for more than a moment. A touch zone of 0.7 cm$^2$, centred on the map, has been found to be sufficient.

The FIG. 10 menu mode displays a small number of large icons, one of which is the 'avoid roadblock' 10A option. This can be selected with one touch; when this occurs, the software re-calculates the route and gives instructions in the normal manner (voice; and/or on screen navigation prompts) to allow the user to proceed to his destination but avoid the road immediately ahead.

Alternative Route Function: 'Avoid Specific Road'

This function allows a user to easily and rapidly select a specific, named road 10B to mark as blocked so that he can use information from real time traffic information broadcasts on the radio.

When listening to the radio, a user may hear that a specific road or perhaps part of a motorway between defined junctions is blocked or heavily congested. Alternatively, the device may receive dynamic travel information, e.g. from a remote server, which will provide data that certain roads are affected by congestion, adverse weather, other local incidents etc. If that road is on the user's calculated route, even though it might be many kilometers away, then he will want to have the software recalculate a new route as soon as possible. The next three such adversely affected roads are automatically listed on the Recalculate route menu FIG. 10 to facilitate the driver selecting any of those roads as roads to be excluded from a fresh route re-calculation. The system does this re-calculation by calculating a route to the final destination using the current position as a start position and exploring different routes to the destination, but excluding the road indicated as to be avoided. The new route will then be calculated using normal route planning algorithms and the user diverted onto the new route.

Selecting the 'avoid specific road' function 10B has also to be fast and involve the absolute minimum number of screen interactions to minimise driver distraction. This can be achieved by the user being able to switch from normal navigation mode (FIG. 1 or 2, in which the current position of the car is shown on a map) to a Recalculate menu mode as described earlier (e.g. selecting a given region on the screen); the Recalculate menu displays a small number of large icons, several of which are named roads 10B on the route which, if selected, can be selected with one touch; when this occurs, the software re-calculates the route and gives instructions in the normal manner (voice; and/or on screen navigation prompts) to allow the user to proceed to his destination but avoid the road immediately ahead. The device may have limited screen space to display many roads for exclusion; the FIG. 3 implementation lists three. These three are selected using various weighting parameters (e.g. a prior history of the user wishing to avoid them; the next three major roads) or from dynamic, updated travel information received by the device from a traffic information data source, indicating that these are the next three roads on the route that are affected by traffic disturbance of some kind.

A final 'original' option 10D allows the user to clear all earlier re-calculation inputs and re-calculate the original route.

Alternative Route Function: Auto Generate

A user can also simply select 'alternative route' 10C if he wants to see another possible route: the system then recalculates a route, not using at least 80% of the roads from the prior route. If that route is still unsuitable, the user can obtain another alternative route again by selecting again 'alternative route' 10C.

Alternative Route Planning: Selecting Calculation Modes

A user can select 'normal', 'strict' and 'fast' planning modes: each results in different route planning algorithms being used that calculate the route either normally, or strictly (which may take many minutes as a great many permutations are explored) or quickly, (which may take a few seconds only as many simplifying assumptions are made about the optimal route).

APPENDIX 1

GO Product Specification

Introduction

Go is a stand-alone fully integrated personal navigation device. It will operate independently from any connection to the vehicle.

Target Markets

Go is indented to address the general personal navigation market. In particular it is designed to extend the market for personal navigation beyond the "early adopter" market. As such it is a complete stand-alone solution; it does not require access to a PC, PDA or Internet connection. The emphasis will be on completeness and ease of use. Although Go is a complete personal navigation solution it is primarily intended for in vehicle use. The primary target market is anybody who drives a vehicle either for business or pleasure.

To successfully address this market Go must satisfy the following top-level requirements:

1. Acceptable price point—Appropriate compromise between product features and cost.
2. Simplicity—Installation and operation of Go will be simple and intuitive, all major functions should be accomplished by an average non PC-literate user without recourse to the product manual.
3. Flexibility—All map data and operating programs will be supplied on plug in memory cards. The device can easily be extended to cover different locals.
4. Reliability—Although in-car navigation systems are not considered safety critical components users will come to rely on Go. It will be engineered to all relevant automotive environmental standards. In addition it will be tolerant to short GPS coverage outages.

Channels

Consumer electronics retail outlets
Automotive accessory outlets
Specialist car accessory fitting garages Product Summary Go is an in-vehicle personal navigation device. It is designed as an appliance, that is, for a specific function rather than a general purpose one. It is designed for the consumer after-sales automotive market. It will be simple to use and install by the end user, although a professional fitting kit will be optionally supplied.

The principal features are:
Built on standard commodity PocketPC 2002 components
Standard PocketPC 3.5" _VGA transflective TFT LCD display mounted in landscape orientation
Romless soft-boot memory architecture
Highly integrated ARM9 200 MHz CPU
SD card memory slot for application and map data storage
Integrated GPS receiver and antenna
Integrated two axis accelerometer for simple dead reckoning
Power, audio, debug and external GPS antenna connections made through docking connector on base of unit
Embedded Linux OS with no GUI layer, application provides its own UI
Very simple touch screen UI optimised for finger use
High quality integrated speaker for voice instructions
Internal rechargeable Li-Ion battery giving at least five hours of continuous operation Operating System Go will use a customised version of embedded Linux. This will be loaded from an SD card by a custom boot-loader program which resides in Flash memory Hard Buttons Go will have only one hard button, the power button. It is pressed once to turn on or off Go. The UI will be designed so that all other operations are easily accessible through the pen based UI.

There will also be a concealed hard reset button.

Architecture

Go architecture is based around a highly integrated single chip processor designed for mobile computing devices. This device delivers approximately 200 MIPs of performance from an industry standard ARM920T processor. It also contains all the peripherals required excluding the GPS baseband. These peripherals include DRAM controller, timer/counters, UARTs, SD interface and LCD controller.

Figure 14:
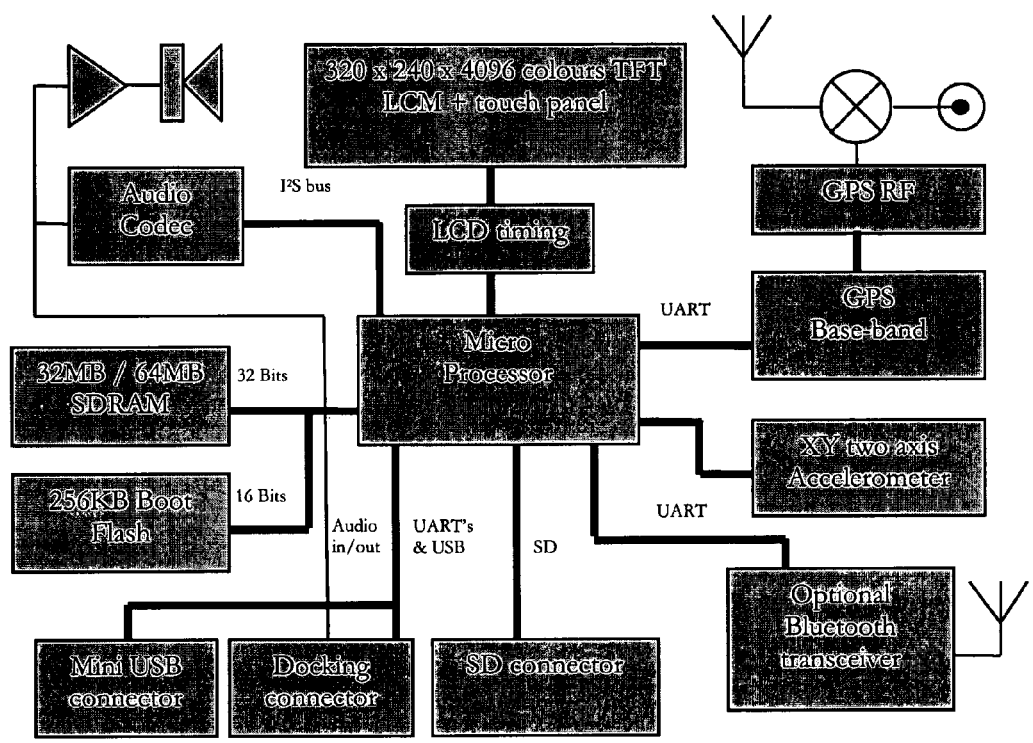
FIG. 14 is a block diagram of components in the navigation device.

The main elements of this architecture are:
Microprocessor running at 200 MHz
32 MB or 64 MB of fast synchronous DRAM (SDRAM) with low power self refresh. Arranged as two devices on a 32 bit wide 100 MHz bus
SD card interface for all non-volatile storage including the OS (No RAM drive)
Native (bare metal) boot loader stored in 256 KB of NOR Flash. This Flash device will contain a boot sector which is write protected to store protected data such as unique product ID's and manufacturing data.
Debug UART (RS232 3V levels) connected to the docking connector
USB client for PC connectivity
Integrated GPS receiver
Integrated two axis accelerometer
Optional integrated Bluetooth transceiver for PDA and mobile phone connectivity
High quality audio through I$^2$S codec and amplifier
FIG. 14 is the Go block diagram.

Power Management

Go will be powered from an integrated Li-Ion 2200 mAH rechargeable battery. This battery can be charged, and the device powered (even if the battery contains no charge) from an externally supplied +5V power source. This external +5V power source is supplied via the docking connector or a DC jack socket.

This +5V supply will be generated from the vehicle's main supply rail or from a mains adapter externally. The device will be turned on and off by a single button. When the device is turned off the DRAM contents will be preserved by placing the RAM in self-refresh so that when switched on Go will resume from where it was switched off. There will also be a wake-up signal available through the docking connector, this can be used to auto-switch on Go when the vehicle ignition is switched on.

There will also be a small hidden reset switch.

System Memory Architecture

In contrast to conventional embedded devices which execute all the OS and application code in place from a large mask ROM or Flash device, Go will be based on a new memory architecture which is much closer to a PC.

This will be made up of three forms of memory:

1. A small amount of XIP (eXecute In Place) Flash ROM. This is analogous to the PC's BIOS ROM and will only contain a proprietary boot loader, E$^2$ emulation (for UID and manufacturing data) and splash screen bit maps. This is estimated to be 256 KB in size and would be on a slow 8 bit wide SRAM interface.
2. The main system memory, this is analogous to the PC's main memory (RAM). This will be where all the main code executes from as well as providing the video RAM and workspace for the OS and applications. Note: No persistent user data will be stored in the main system RAM (like a PC) i.e. there will be no "Ram drive". This RAM will be exclusively connected to a 32 bit 100 MHz synchronous high-speed bus. Go will contain two sites for 16 bit wide 256/512 Mbit SDRAM's allowing memory configurations of 32 MB (16 bit wide) 64 MB 32 bit wide and 128 MB (32 bit wide).
3. Non-volatile storage, analogous to the PC's hard disk. This is implemented as removable NAND flash based SD cards. These devices do not support XIP. All the OS, application, settings files and map data will be permanently stored on SD cards Audio A 52 mm diameter speaker is housed in Go to give good quality spoken instructions. This will be driven by an internal amplifier and audio codec. Audio line out will also be present on the docking connector.

SD Memory Slot

Go will contain one standard SD card socket. These are used to load system software and to access map data.

Display

Go will use a transflective 3.5" TFT backlit display It will be a 'standard' _VGA display as used by PocketPC PDA's. It will also contain a touch panel and bright CCFL backlight.

Power Supplies

Power Supply—AC Adapter Socket
4.75V to 5.25V (5.00V+/−5%) @ 2A

Power Supply—Docking Connector
4.75V to 5.25V (5.00V+/−5%) @ 2A

Variants

It shall be possible to assemble and test the following variants of Go:

Standard (Bluetooth Depopulated, 32 Mbyte RAM)

In the Standard variant the Bluetooth function is not populated, and 32 Mbytes RAM is fitted.

Bluetooth Option (Future Variant)

The product design should include Bluetooth although it is not populated in the standard variant to minimise BOM cost. The design should ensure that all other functions (including GPS RF performance) operate without degradation when the Bluetooth function is operating.

64 Mbyte RAM Option (Future Variant)

The product design should ensure it is possible to fit 64 Mbyte RAM instead of 32 Mbyte.

Subassemblies

Figure 15:
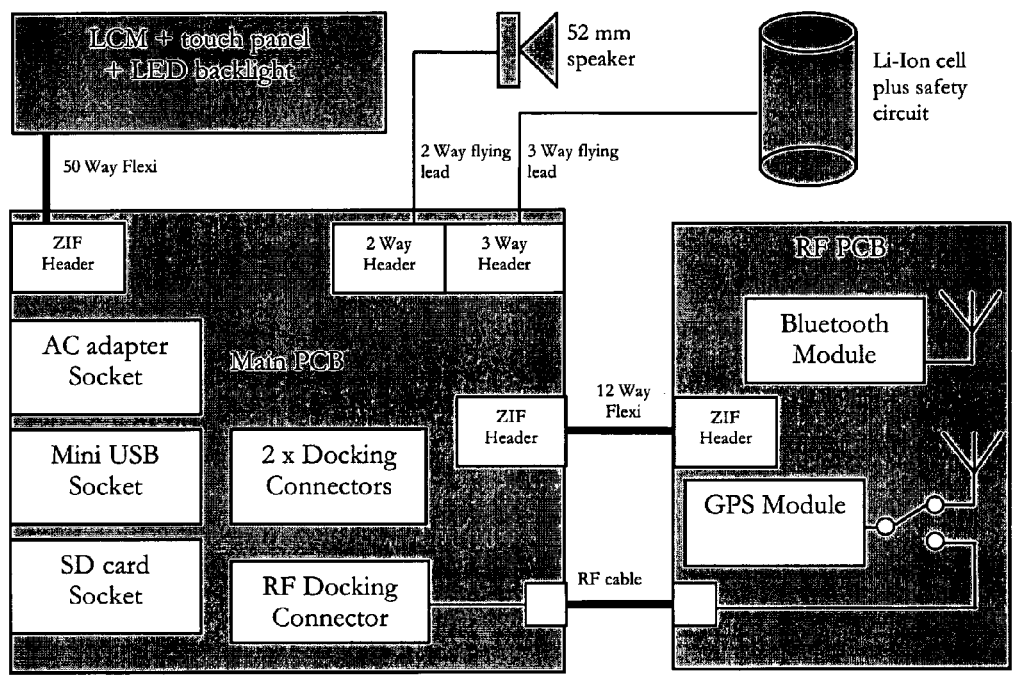
FIG. 15 is a diagram of the electrical subassemblies in the FIG. 14 navigation device.

Go consists of the following electrical subassemblies, shown in FIG. 15.

RF Cable

The RF cable feeds the RF signal from an external GPS antenna (which connects to Go via the RF docking connector) to the RF PCB where the GPS module is situated.

External Connectors

Docking Connectors

Two Docking Connectors provide an interface to external Docking Stations.

Docking Connector #1 Pinout

| Pin | Signal | Dir | Type | Description |
|---|---|---|---|---|
| 1 | GND | — | — | Signal and power GND |
| 2 | GND | — | — | |
| 3 | DOCKSNS1 | I/P | PU | Docking Station Sense [0, 1] - |
| 4 | DOCKSNS0 | I/P | PU | These signals are connected to pull-up resistors within the unit. The Docking Station pulls either or both of these signals to GND to indicate the presence and type of Docking Station. |
| 5 | AUDIOL | O/P | | Audio line outputs (Left and Right) |
| 6 | AUDIOR | O/P | | to connect to car audio system. |
| 7 | MUTE | O/P | O/D | The unit pulls this line to GND to signal the car audio system to mute itself while the unit is issuing a voice command. |
| 8 | IGNITION | I/P | PD | Ignition sense. |
| 9 | DOCKPWR | I/P | PWR | +5 V power from the Docking |
| 10 | DOCKPWR | I/P | PWR | Station to simultaneously power the unit and charge the battery. |

PWR Power connection
O/D Open-Drain output
PU Pull-Up resistor within the unit
PD Pull-Down resistor within the unit Docking Connector #2 Pinout

| Pin | Signal | Dir | Type | Description |
|---|---|---|---|---|
| 1 | TXD | O/P | UART | 3 V logic level UART signals |
| 2 | RXD | I/P | UART | |
| 3 | RTS | O/P | UART | |
| 4 | CTS | I/P | UART | |
| 5 | GND | — | PWR | |
| 6 | nTRST | I/P | JTAG | CPU JTAG signals for test and configuration |
| 7 | TMS | I/P | JTAG | |
| 8 | TCK | I/P | JTAG | |
| 9 | TDI | I/P | JTAG | |
| 10 | TDO | O/P | JTAG | |

RF Docking Connector

The RF Docking Connector allows connection of an external active GPS antenna via a Docking Station.

AC Adapter Socket

The AC adapter socket allows power to be supplied from a low cost AC adapter or CLA (Cigarette Lighter Adapter).

USB Connector

The USB connector allows connection to a PC by means of a standard mini USB cable.

SD Card Socket

A hard locking SD card socket suitable for high vibration applications supports SDIO, SD memory and MMC cards.

(Although Go provides hardware support for SDIO, software support will not be available at the time of product introduction)

Processor

The processor is the ARM920T based SOC (System on chip) operating at approx 200 Mhz.

RAM

Go will be fitted with RAM to the following specification:

| | |
|---|---|
| Type | SDRAM with low-power refresh ("mobile" SDRAM) |
| Total memory | 32 Mbyte (standard) or 64 Mbyte (future option) |
| Bus width | 32-bit |

-continued

| | |
|---|---|
| Minimum speed | 100 Mhz |
| Maximum self refresh current | 500 _A per device |
| Configuration | 2 × 16-bit wide CSP sites |

Flash Memory

Go will be fitted with a minimum of 256 kbyte of 16-bit wide Flash Memory to contain the following:
  Boot loader code to enable loading of O/S from SD card
  Factory set read-only protected manufacturing parameters (e.g. manufactured date) and unique ID (E2PROM emulation)
  User specific settings (E2PROM emulation)

The following devices can be used depending on price and availability:

GPS Internal Antenna

The GPS internal antenna is attached directly to the RF PCB.

GPS External (Active) Antenna Switching

When an external antenna is connected via the RF Docking Connector, the GPS antenna source is automatically switched to the external antenna.

Accelerometer

A solid state accelerometer is connected directly to the processor to provide information about change of speed and direction.

Auxiliary Functions

Ignition Synchronization

Ignition Wakeup

A rising edge on the Docking Station IGNITION signal will wakeup the unit. The IGNITION signal may be connected to a 12V or 24V vehicle battery.

Ignition State Monitoring

The state of the Docking Station IGNITION signal is detected and fed to a GPIO pin to allow software to turn off the unit when the ignition signal goes low.

Standard Peripherals

The following peripherals will be included as standard with Go.
  Simple docking shoe. Mounts Go and allows charging through a DC jack. No other connectivity is included in the simple dock.
  Cigarette lighter power cable connecting to Go through the DC jack socket or simple docking shoe.
  Mini USB cable for PC connectivity
  Universal mains adapter for connection to DC Jack socket Optional Peripherals The following optional peripherals will be available at or after the time of launch of Go
  Active antenna kit. Contains a GPS active antenna and a docking shoe with GPS RF connector and cable fitted. For self installation when an external antenna is required.
  Professional vehicle docking kit. For fitting by professional installation only. Allows direct connection to vehicle supply, audio system and active antenna via a vehicle interface box.

The invention claimed is:

1. A navigation device programmed with a map database and software that enables a route to be planned between two user-defined places, in which the device is further programmed to calculate and to display a 2-D or 3-D representation of the actual road being traveled along and the current location of the device on that road and to receive and process dynamic travel information relating to the route;
  wherein the device is configured to calculate and to display a schematic view showing, at one time, at least a remainder of the entire route from the current location of the device, for any location of the device on the route, the schematic view including graphical depictions of dynamic travel information relating to the route;
  wherein the dynamic travel information is represented by a selectable graphical icon or selectable option that, when selected by touching the icon or option, the device displays a relatively increased amount of detail of the dynamic travel information associated with the selected icon or option, the relatively increased amount of detail includes a textual description of the dynamic travel information.

2. The device of claim 1 in which the schematic view is a linear representation showing the entire route or the remainder of the route.

3. The device of claim 1 in which an icon is displayed that represents how recently the dynamic travel information was received by the device.

4. The device of claim 1 in which the dynamic travel information is displayed at the same time as the 2-D or 3-D representation.

5. The device of claim 1 in which the dynamic travel information is only displayed at a different time from the 2-D or 3-D representation.

6. The device of claim 1 in which the dynamic travel information is a dynamic representation of traffic conditions.

7. The device of claim 6 in which the dynamic representation of traffic conditions graphically represents a traffic flow direction.

8. The device of claim 7 in which the dynamic representation of traffic conditions also graphically represents at least one of the following traffic conditions:
  (i) stationery traffic;
  (ii) queuing traffic;
  (iii) slow traffic;
  (iv) road closure or lane closure or road works.

9. The device of claim 1 in which the graphical icon or the other kind of selectable option represents at least one of the following:
  (i) accident;
  (ii) traffic jam;
  (iii) road works;
  (iv) road closure;
  (v) general incident;
  (vi) lane closed;
  (v) heavy rain;
  (vi) strong winds;
  (vii) ice;
  (viii) fog.

10. The device of claim 9 in which the touch to the screen is a single or a double touch.

11. The device of claim 10 in which the touch has to be at a region of the touch screen sized to be sufficiently large to allow it to be reliably selected with a fingertip.

12. The device of claim 11 in which the region is at least 0.7 cm.sup.2 in area.

13. The device of claim 1, wherein a user can, by touching a screen on the device, task away from the 2-D or 3-D representation of the actual road being traveled along to a menu screen which displays one or more options that, if selected through a further touch action, initiate a re-calculation of the route.

14. The device of claim 13 in which the menu screen displays selectable options relating to one or more of the following functions:
    (a) calculate alternative route;
    (b) calculate alternative route without including a pre-defined extent of the road ahead;
    (c) calculate alternative route without including a pre-defined road;
    (d) revert to original route.

15. The device of claim 9 in which each selectable option is one of the following:
    (a) a graphical icon;
    (b) a control or check box; or
    (c) a name.

16. The device of claim 1 that receives dynamic travel information using a receiver for a wireless network.

17. The device of claim 16 in which the wireless network is a short range network established between the device and a mobile telephone, the mobile telephone obtaining the dynamic travel information over a cellular wide area network.

18. The device of claim 16 in which the dynamic travel information sent to the device comprises geocoded data that defines the location to which the dynamic travel information relates.

19. The device of claim 16 in which the dynamic travel information sent to the device comprises non-geocoded location data that defines the location to which the dynamic travel information relates and the software on the device geocodes that data.

20. The device of claim 1 that can send a request to a remote server over a wireless communications network for dynamic travel information relevant to a defined route, the remote server (i) receiving dynamic travel information from one or more data feeds in relation to numerous roads and (ii) sending the dynamic travel information that is relevant to the defined route to the device in response to the request.

21. The device of claim 19 in which the non-geocoded data is in TMC format and the device includes in memory TMC tables that it can look up in order to relate the TMC format data to a location in the geocoded co-ordinate system that the device uses so that it can display the travel information at the applicable position.

22. The device of claim 20 that regularly or at pre-defined times or intervals polls the server for updated dynamic travel information.

23. The device of claim 20 in which the request is an initial request for dynamic travel information and subsequently the server automatically pushes updated dynamic travel information to the device.

24. A method of displaying navigation information, the method being deployed in a navigation device programmed with a map database and software that enables a route to be planned between two user-defined places, in which the device is further programmed to calculate and to display a 2-D or 3-D representation of the actual road being traveled along and the current location of the device on that road and to receive and process dynamic travel information relating to the route, the method comprising:
    calculating and displaying a schematic view showing, at one time, at least a remainder of the entire route, from the current location of the device, for any location of the device on the route, the schematic view including dynamic travel information relating to the route;
    providing a selectable graphical icon or selectable option, representing the dynamic travel information that, such that, when the selectable icon or option is selected by touching, the device displays a relatively increased amount of detail of the dynamic travel information associated with the selected icon or option, the relatively increased amount of detail includes a textual description of the dynamic travel information.

25. A computer readable medium storing computer readable code for, when executed on a device, instructing the device to enable a route to be planned between two user-defined places, the code comprising:
    code sequences to enable the device to calculate and to display a 2-D or 3-D representation of the actual road being traveled along and the current location of the device on that road and (ii) receive and process dynamic travel information relating to the route;
    wherein the code sequences enable the device to calculate and display a schematic view showing, at one time, at least the remainder of the entire route, from the current location of the device, for any location of the device on the route, the schematic view including graphical depictions of dynamic travel information relating to the route,
    wherein the dynamic travel information is represented by code sequences which enable the device to provide a selectable Graphical icon or selectable option that, when selected by touching the icon or option, the device displays a relatively increased amount of detail of the dynamic travel information associated with that selectable icon or option, the relatively increased amount of detail includes a textual description of the dynamic travel information.

* * * * *